US008642496B2

(12) United States Patent
Xia et al.

(10) Patent No.: US 8,642,496 B2
(45) Date of Patent: Feb. 4, 2014

(54) METHOD FOR FORMING A CATALYST COMPRISING CATALYTIC NANOPARTICLES AND A CATALYST SUPPORT

(75) Inventors: Zetao Xia, Singapore (SG); Liang Hong, Singapore (SG); Wei Wang, Singapore (SG); Zhao Lin Liu, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 229 days.

(21) Appl. No.: 13/182,396

(22) Filed: Jul. 13, 2011

(65) Prior Publication Data

US 2012/0024757 A1 Feb. 2, 2012

Related U.S. Application Data

(60) Provisional application No. 61/363,662, filed on Jul. 13, 2010.

(51) Int. Cl.
| | | |
|---|---|---|
| B01J 21/18 | (2006.01) | |
| B01J 23/00 | (2006.01) | |
| B01J 23/10 | (2006.01) | |
| B01J 23/40 | (2006.01) | |
| B01J 23/74 | (2006.01) | |
| H01M 4/36 | (2006.01) | |
| H01M 4/48 | (2010.01) | |
| H01M 8/10 | (2006.01) | |
| C10G 35/06 | (2006.01) | |
| H01B 1/02 | (2006.01) | |

(52) U.S. Cl.
USPC ........... 502/180; 502/185; 502/304; 502/337; 423/653; 423/654; 977/776; 977/810; 977/811; 977/948; 429/484; 429/486; 429/489; 208/137; 208/138

(58) Field of Classification Search
USPC .......... 502/180, 185, 304, 337; 423/653, 654; 977/776, 810, 811, 948; 429/484, 486, 429/489; 208/137, 138; 252/520.2, 521.1
See application file for complete search history.

(56) References Cited

U.S. PATENT DOCUMENTS 6,713,040 B2 * 3/2004 Ahmed et al. ................ 423/652
7,498,095 B2 * 3/2009 Finnerty et al. .............. 429/486
(Continued)

FOREIGN PATENT DOCUMENTS

| CN | 101475377 | * | 7/2009 | .............. C04B 35/50 |
| WO | WO 2006/077256 A1 | | 7/2006 | |

(Continued)

OTHER PUBLICATIONS

"Fabrication and evaluation of the electrochemical performance of the anode-supported solid oxide fuel cell with the composite cathode of La0.8Sr0.2MnO3-d-Gadolinia-doped ceria oxide/La0.8Sr0.2MnO3-d," Wei-Xin Kao et al. Journal of Power Sources 195 (2010), pp. 6468-6472.*

(Continued)

*Primary Examiner* — Patricia L Hailey
(74) *Attorney, Agent, or Firm* — Blakely, Sokoloff, Taylor & Zafman LLP

(57) ABSTRACT

The present invention relates to a method for forming a catalyst comprising catalytic nanoparticles and a catalyst support, wherein the catalytic nanoparticles are embedded in the catalyst support, comprising forming the catalytic nanoparticles on carbon particle, dispersing the carbon particle in a solution comprising precursors of the catalyst support to form a suspension, heating the suspension to form a gel, subjecting the gel to incineration to form a powder, and sintering the powder to form the catalyst.

40 Claims, 7 Drawing Sheets

(56) References Cited

U.S. PATENT DOCUMENTS

| | | | |
|---|---|---|---|
| 7,595,127 B2* | 9/2009 | Seabaugh et al. | 429/486 |
| 7,666,534 B1* | 2/2010 | Liu | 429/425 |
| 2004/0163311 A1* | 8/2004 | Ahmed et al. | 48/127.9 |
| 2006/0040168 A1* | 2/2006 | Sridhar | 429/40 |
| 2009/0011307 A1* | 1/2009 | Lee et al. | 429/27 |
| 2010/0048387 A1 | 2/2010 | Zhang et al. | |
| 2012/0003565 A1* | 1/2012 | Son et al. | 429/496 |

FOREIGN PATENT DOCUMENTS

| | | |
|---|---|---|
| WO | WO 2007/044614 A2 | 4/2007 |
| WO | WO 2007/096785 A2 | 8/2007 |

OTHER PUBLICATIONS

"Synthesis and characterization of Gd0.1Ce0.9O1.95 nanopowder via an acetic-acrylic method," Ai Zhu Liu et al. Ceramics International (2013), pp. 1-7.*

"High temperature electrolyte supported Ni-GDC/YSZ/LSM SOFC operation on two-stage Viking gasifier product gas," Ph. Hofmann et al. Journal of Power Sources 173 (2007), pp. 357-366.*

"Fabrication and Performance of Impregnated Ni Anodes of Solid Oxide Fuel Cells," San Ping Jiang et al. J. Am. Ceram. Soc., 88 [7] (2005), pp. 1779-1785.*

"Electrocatalytic Promotion of Palladium Nanoparticles on Hydrogen Oxidation of Ni/GDC Anodes of SOFCs via Spillover," Alireza Babaei et al. Journal of the Electrochemical Society, 156 (9) (2009), pp. B1022-B1029.*

"GDC-impregnated Ni anodes for direct utilization of methane in solid oxide fuel cells," Wei Wang et al. Journal of Power Sources 159 (2006), pp. 68-72.*

"Effect of nickel nano-particle sintering on methane reforming activity of Ni-CGO cermet anodes for internal steam reforming SOFCs," D. Hari Prasad et al. Applied Catalysis B: Environmental 101 (2011), pp. 531-539.*

Ni-Ce0.9Gd0.1O1.95 anode for GDC electrolyte based low-temperature SOFCs, Shaowu Zha et al. Solid State Ionics 166 (2004), pp. 241-250.*

"Effect of variation of NiO on properties of NiO/GDC (gadolinium doped ceria) nano-composites," A. U. Chavan et al. Ceramics International 38 (2012), pp. 3191-3196.*

"Ni/Ce1−xMx Catalyst Generated from Metallo-organic Network for Autothermal Reforming of Diesel Surrogate," L. Liu et al. Applied Catalysis A, General (2013), pp. 1-33.*

"Combustion synthesis of gadolinia-doped ceria using glycine and urea fuels," R. K. Lenka et al. Journal of Alloys and Compounds 466 (2008), pp. 326-329.*

Pankaj Kalra, et al., "Structural Properties of NiO—CGO Composites Precursor Prepared via Combustion Synthesis Route," Asian Journal of Chemistry, vol. 21, No. 10, 6pgs. (2009).

Hai-jun Zhang, et al., "Preparation of Ni/C core-shell composite powders by electroless plating method," Trans. Noferrous Met. Soc. China vol. 17, pp. s1144-s1147 (2007).

Inyong Kang, et al., "The micro-reactor testing of catalysts and fuel delivery apparatuses for diesel autothermal reforming," Catalysis Today vol. 136, pp. 249-257 (2008).

Peter Erri, et al., "Novel perovskite-based catalysts for autothermal JP-8 fuel reforming," Chemical Engineering Science, vol. 61, pp. 5328-5333 (2006).

Glenn O. Mallory, "The Fundamental Aspects of Electroless Nickel Plating," Chapter 1 of "Electroless Plating: Fundamentals and Applications" by Glenn O. Mallory, Juan B. Hajdu, America Electroplaters and Surface Finishers Society, 56 pages (1990).

Austrian Search Report for Singapore Counterpart Patent Application No. 201105081-2, 5 pgs. (Nov. 30, 2011).

* cited by examiner

METHOD FOR FORMING A CATALYST COMPRISING CATALYTIC NANOPARTICLES AND A CATALYST SUPPORT

CROSS-REFERENCE TO RELATED APPLICATION

This application claims the benefit of priority of U.S. Provisional Patent Application No. 61/363,662, filed 13 Jul. 2010, the contents of which being hereby incorporated by reference in its entirety for all purposes.

TECHNICAL FIELD

The invention relates to a method for forming a catalyst, and in particular, to a method for forming a catalyst comprising catalytic nanoparticles and a catalyst support for use in reforming of a fuel as well as the thus produced catalyst.

BACKGROUND

Electrical power generation from primary energy sources is becoming one of the most concerned issues in the world. Traditional energy conversion techniques relies mainly on fossil fuels combustion. The combustion of fossil fuels has been identified as the major source of global warming and air pollution. The climate change in recent years requests urgent development of high efficiency clean energy systems. Fuel cell system is one of the alternative energy conversion systems that potentially has a high energy conversion efficiency. Various types of fuel cells have been developed in recent decades. Among them, solid oxide fuel cells (SOFCs), which normally operate in the high temperature range from about 600° C. to about 1000° C., could be combined with other thermal cycles to improve the thermal efficiency and to have high tolerance for sulfur components and carbon monoxide (CO). Coincidentally. CO is also a fuel for SOFCs. Therefore, SOFCs could be fuelled up by synthesis gas obtained from reforming of infrastructure fuel, such as diesel fuel, using as an auxiliary power unit (APU) in automotive applications, for instance.

Diesel fuel reforming can be carried out by three different mechanisms: steam reforming (SR), partial oxidation (POX) and auto-thermal reforming (ATR). Catalytic ATR, which may be viewed as a combination process of SR and POX, besides its well-known high energy efficiency, has shown unique advantages in scavenging carbon deposited on catalyst by super-heated steam and producing high selectivity of hydrogen.

The study of catalytic ATR of diesel fuel started in early 1980s using traditional Ni-based catalyst. Recent progresses in liquid hydrocarbon reforming catalytic systems have found that noble metals such as Rh, Pt and Pd supported on refractory oxide exhibit superior catalytic reactivity over the traditional Ni-based catalyst in terms of preventing carbon deposition and sulfur poisoning. Studies have also shown that certain Rh-based catalysts perform exceptionally well. However, as Rh is among the most expensive precious metals available, it is economically unfeasible to rely on Rh-based catalysts for devising an APU to power fuel cells on a long term basis. While Ni-based catalysts are much more abundant and are therefore cheaper than noble metal-based catalysts, Ni-based catalysts nevertheless face the problem of carbon deposition during the diesel fuel reforming.

Traditionally, alumina-based materials were used as a catalyst support for the Ni-based catalysts. In recent years, catalyst supports formed of oxygen anion conducting materials, such as doped ceria, zirconia and their mixed composites, have been shown to afford higher resistance to carbon deposition and sulfur poisoning compared to alumina-based supports. For example, ceria-based oxygen anion conducting material has been used as a support for Ni nanoparticles. Ni nanoparticles supported on ceria-based supports have been found to show resistance to carbon deposition during methane reforming, but not during dodecane or hexadecane reforming.

Supported catalysts are traditionally made by impregnation method. In the case of Ni nanoparticles supported on ceria made by impregnation method, most of the Ni nanoparticles surfaces do not contact with the ceria, and thus are not protected by ceria against sintering and thereafter carbon deposition and sulfur poisoning. As a result, conventional supported Ni-based catalysts are vulnerable to deactivation due to carbon deposition and adsorption of sulfur-containing compounds that are present during the reaction of reforming diesel oils.

SUMMARY OF THE INVENTION

In a first aspect, the present invention relates to a method for forming a catalyst comprising catalytic nanoparticles and a catalyst support, wherein the catalytic nanoparticles are embedded in the catalyst support.

In various embodiments the method for forming a catalyst comprising catalytic nanoparticles and a catalyst support, includes the steps of: forming the catalytic nanoparticles on carbon particles, dispersing the carbon particles in a solution comprising precursors of the catalyst support to form a suspension, heating the suspension to form a gel, subjecting the gel to incineration to form a powder, and sintering the powder to form the catalyst.

In another aspect, the present invention is directed to a catalyst being obtained or obtainable by the methods of the invention.

In still further aspect, the present invention provides for a method for auto-thermal reforming of a fuel, comprising contacting the catalyst of the invention with said fuel.

In still another aspect, the present invention relates to the use of the catalyst of the invention for auto-thermal reforming of a fuel.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

DESCRIPTION

The following detailed description refers to the accompanying drawings that show, by way of illustration, specific details and embodiments in which the invention may be practiced. These embodiments are described in sufficient detail to enable those skilled in the art to practise the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The present invention in a first aspect relates to a method for forming a catalyst comprising catalytic nanoparticles and a catalyst support, wherein the catalytic nanoparticles are embedded in the catalyst support. In a thus formed catalyst, the surfaces of the embedded catalytic nanoparticles contact and interact with the particles of the catalyst support, and are therefore protected against carbon deposition and sulfur poisoning. By embedding the catalytic nanoparticles in the catalyst support, the life-span of the catalytic nanoparticles can be increased, which in turn increases the life-span and efficiency of the catalyst.

Figure 1:
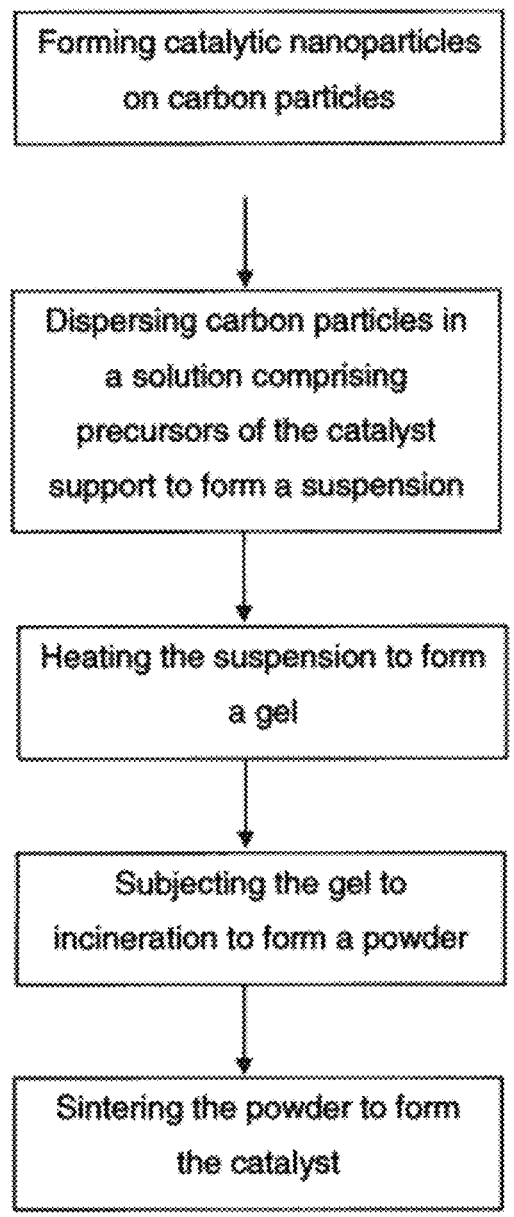
FIG. 1 shows a flow chart of the present method for forming a catalyst having catalytic nanoparticles and a catalyst support, wherein the catalytic nanoparticles are embedded in the catalyst support.
Figure 2:
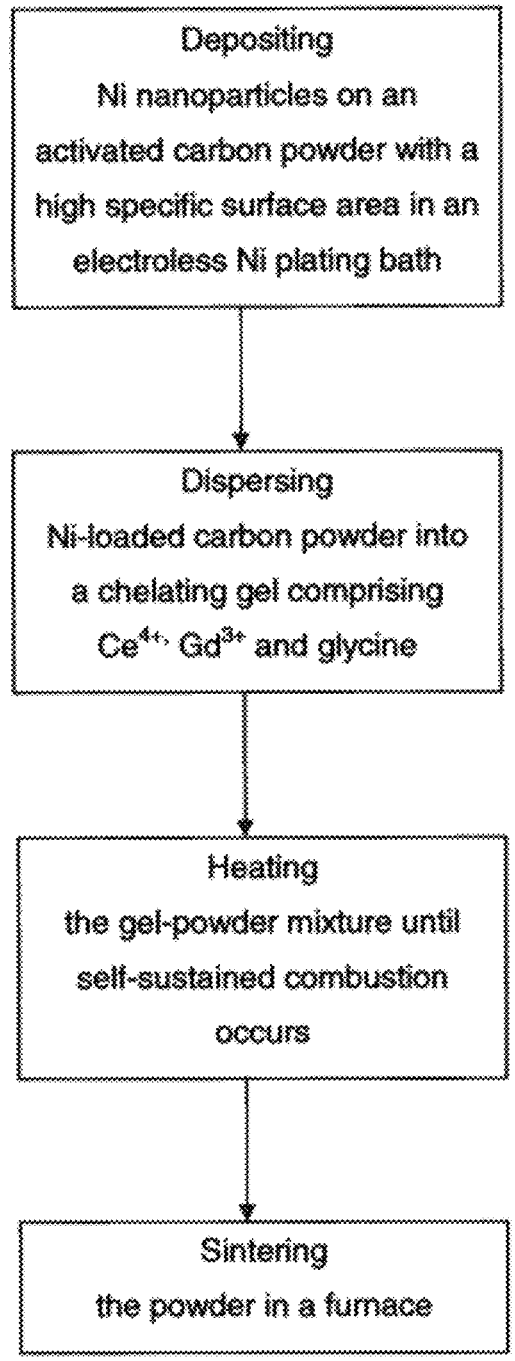
FIG. 2 shows a flow chart of the present method for forming a catalyst of Example 3.

In various embodiments, the method as illustrated in FIG. 1 may include forming the catalytic nanoparticles on carbon particles, dispersing the carbon particles in a solution comprising precursors of the catalyst support to form a suspension, heating the suspension to form a gel, subjecting the gel to incineration to form a powder, and sintering the powder to form the catalyst.

In various embodiments, the catalyst is produced in form of ceramic microparticles.

In various embodiments, the method may further include activating the catalyst by reduction.

In one embodiment, the reduction may include contacting the catalyst with hydrogen ($H_2$). Such step may for example include contacting a catalyst precursor, wherein the catalytic nanoparticles are present in form of an catalytically inactive metal oxide, with hydrogen to reduce the metal oxide to the respective metal which has catalytic activity.

The term "catalytic nanoparticles", as used herein, generally relates to nanoparticles capable of catalyzing a reaction, such as, but not limited to, reforming of a fuel. it is to be understood and appreciated that such catalytic nanoparticles include nanoparticles in their active form as well as precursors that may be inactive and have to be activated before use. For example, in a nickel-based catalyst, for example for reforming of hydrocarbons, nickel oxide (NiO) particles may be present due to oxidation of nickel in the presence of oxygen/air. As NiO may be reduced to the catalytically active elemental nickel, for example by hydrogen reduction, the nickel oxide particles may be considered a precursor and fall within the term catalytic nanoparticle as used herein.

Light hydrocarbons such as methane as well as heavy hydrocarbons may undergo reforming in the presence of the catalyst formed by the present method. The catalyst formed by the method of the invention is preferably used to reform fuels. Examples of suitable fuels include, but are not limited to kerosene and diesel. Such fuels may include a variety of different hydrocarbons, including but not limited to dodecane and/or hexadecane. The fuels may also include aromatic compounds and/or sulfur-containing compounds.

In various embodiments, the catalytic nanoparticles of the catalysts of the present invention have a very small particle size in the range of manometers (nm), such as 100 nm or less, 60 nm or less, 40 nm or less, 20 nm or less, 10 nm or less, 5 nm or less, and 3 nm or less. In certain embodiments, the catalytic nanoparticles are smaller than about 10 nm. In one embodiment, the catalytic nanoparticles have a particle size of about 3 nm. In a further embodiment, the catalytic nanoparticles are smaller than 3 nm.

The catalytic nanoparticles of the present invention are not limited to any particular shape and as such may be regularly shaped, irregularly shaped or both. Examples of nanoparticle shapes include spherical, elongated, or thread-like.

In various embodiments, the catalytic nanoparticles may be metal or metal oxide nanoparticles. The term "metal", as used in this context, include metal alloys, metal composites, or combinations thereof. This means that the metal nanoparticles of the invention can comprise, consist essentially of or consist of a single metal or may comprise, consist essentially of or consist of two or more different metals. Similarly, the term "metal oxide", as used in this context, is not limited to nanoparticles that comprise, consist essentially of or consist of a single metal oxide, but also includes embodiments where the nanoparticle comprises, consists essentially of or consists of two or more metal oxides. Also encompassed are nanoparticles that comprise or consist of both, metals and metal oxides. For example, a catalytic nanoparticle of the invention may comprise or consist of a metal that is partially oxidized.

In one embodiment, the catalytic nanoparticles may be nickel (Ni) or nickel oxide (NiO) nanoparticles.

In a further embodiment, the catalytic nanoparticles may be a mixture of Ni and NiO nanoparticles.

By "catalyst support" is meant a support or a supporting structure or a supporting material for supporting the catalytic nanoparticles. Generally, any catalyst support capable of supporting and providing adequate dispersion for the catalytic nanoparticles may be used. The support is preferably stable in the local environment where the catalyst is to be used. The support preferably has a specific surface area and/or porosity sufficient to provide dispersion of the catalytic nanoparticles. A catalyst support with increased porosity provides more intimate contact between reactants and catalytic nanoparticles.

In various embodiments, the catalyst support may include one or more inorganic oxides. The inorganic oxides may include metal oxides. Examples of suitable metal oxides may be one or more elements selected from nickel, cobalt, manganese, titanium, zirconium, iron and rare earth elements such as cerium and gadolinium. In certain embodiments, the inorganic oxide includes two or more of such metals oxides.

In various embodiments, the inorganic oxide may include metal oxides that are doped with another metal (oxide).

In one embodiment, the catalyst support may include ceria.

In various embodiments, the catalyst support may include gadolinium oxide.

In one specific embodiment, the catalyst support may be gadolinium-doped ceria (GDC). The GDC may have the general formula $Ce_{0.9}Gd_{0.1}O_{1.95}$ In various embodiments, wherein the catalyst support is gadolinium-doped ceria (GDC), the precursors of the catalyst support include $Ce^{4+}$ ions and $Gd^{3+}$ ions. These precursors may be provided in form of an aqueous solution of Ce and Gd salts. Suitable salts for forming such a precursor solution include, but are not limited to cerium nitrate and gadolinium nitrate and the respective hydrates thereof. The nitrate salts may have the formulae $Ce(NO_3)_3 \cdot 6H_2O$ and $Gd(NO_3)_3 \cdot 6H_2O$.

In various embodiments, the solution of the precursors of the catalyst support may further include glycine.

The step of subjecting the gel to incineration to form a powder, includes auto-igniting self-sustained combustion processes. One example for such a process is the so-called glycine nitrate combustion method, wherein glycine serves as a fuel and nitrate serves as an oxidizer. In such a process, the catalytic support precursors are used in form of nitrate salts and the solution further comprises glycine.

In various embodiment, the catalyst may be a $Ni/Ce_{0.9}Gd_{0.1}O_{1.95}$ catalyst wherein the nickel nanoparticles are embedded in a catalyst support of formula $Ce_{0.9}Gd_{0.1}O_{1.95}$. In one embodiment, the nickel content may be between 5 and 30% by weight of the catalyst. For example, the nickel content may be about 15% by weight of the catalyst.

By "embedded" is meant the catalytic nanoparticles interact with the supporting material such that substantially the entire surface of a catalytic nanoparticle contacts the catalyst support material, as illustrated in FIG. 10(a). As each catalytic nanoparticle is essentially surrounded by the catalyst support material, migration and coalescence of the catalytic nanoparticle at the reaction temperature are constrained by the surrounding catalyst support material. Due to this constraint, the size of the catalytic nanoparticle remains relatively stable over a period of time. In one embodiment, the entire surface of each catalytic nanoparticle of the present invention contacts the catalyst support material, i.e. the nanoparticle is fully embedded in the catalyst support.

In contrast, the catalyst microparticles illustrated in FIG. 10(b) are produced by conventional impregnation methods and comprise catalytic nanoparticles that have only one side contacting the catalyst support material while the remaining non-contact side are not constrained by the surrounding catalyst support material. In such a catalyst produced by conventional impregnation methods, the catalytic nanoparticles are thus not optimally protected against carbon deposition and sulfur poisoning.

The step of forming the catalytic nanoparticles on carbon particle may, in various embodiments, include depositing the catalytic nanoparticles on the surface of the carbon particle.

In various embodiments, depositing may include precipitating the catalytic nanoparticles on surfaces of the carbon particle. The precipitating of the catalytic nanoparticles on surfaces of the carbon particle may include electrochemical plating of the catalytic nanoparticles on the carbon particle. The plating may be done by electroless plating of the catalytic nanoparticles on the carbon particle. The electroless plating allows high surface area catalytic nanoparticles to be formed on the carbon particle.

In various embodiments, the carbon particles may be in the form of carbon powder. In various embodiments, the carbon powder may include activated carbon powder.

In one embodiment, the carbon powder may be (Pd) palladium-activated carbon powder. Pd-activated carbon powder may be produced according to methods that are well known to those skilled in the art and may include contacting a palladium salt with the carbon powder in an aqueous suspension in the presence of a reducing agent.

In various embodiments, the activated carbon may possess a large specific surface area of at least about 100 $m^2/g$. For example, the activated carbon may possess a specific surface area of more than 150 $m^2/g$, more than 200 $m^2/g$, more than 250 $m^2/g$, more than 300 $m^2/g$, more than 350 $m^2/g$, or more than 400 $m^2/g$. In one embodiment, the activated carbon may possess a specific surface area of about 200 $m^2/g$.

In various embodiments, the activated carbon may possess a large pore volume of at least 0.7 $cm^3/g$. For example, the activated carbon may possess a pore volume of at least 0.7 $cm^3/g$, at least 0.8 $cm^3/g$, at least 1.0 $cm^3/g$, at least 1.2 $cm^3/g$, at least 1.4 $cm^3/g$, at least 1.6 $cm^3/g$, at least 1.8 $cm^3/g$, or at least 2.0 $cm^3/g$. In one embodiment, the activated carbon may possess a pore volume of at least 0.8 $cm^3/g$.

In various embodiments, the activated carbon may possess a high meso-pore volume ratio (i.e. ratio of meso-pore volume to the total pore volume) of at least 20%. For example, the activated carbon may possess a meso-pore volume ratio of at least 20%, of at least 25%, of at least 30%, of at least 35%, at least 40%, at least 45%, at least 50%, at least 55%, at least 60%, at least 65%, at least 70%, at least 75%, or at least 80%. In one embodiment, the activated carbon may possess a meso-pore volume ratio of at least 50%.

In various embodiments, forming the catalytic nanoparticles on carbon particles may include providing an aqueous solution of a catalytic metal salt, adding an organic complexing agent to form a stable nickel complex, adding a reducing agent, dispersing the carbon particles in the solution and heating the solution to precipitate the catalytic metal on the surface of the carbon particles. Precipitating the catalytic metal on the carbon particles may be accomplished by any suitable means, such as mixing the carbon particles with a metal salt solution at a suitable pH and temperature optionally in the presence of a suitable reducing agent. Examples of suitable metal salt solutions include chlorides, nitrates, sulfates, carbonates, etc. Examples of suitable metal salt include nickel salt. In one embodiment, the nickel salt may be nickel sulfate or nickel nitrate.

In one embodiment, ethylenediamine may be added as the organic complexing agent for forming a stable Ni complex.

In various embodiments, the electroless plating is performed in a reducing environment. The reducing environment may be provided by any suitable reducing agent. An electroless plating that is performed in a reducing environment may allow the formation of a metal nanoparticle in a metallic state, such as a Ni nanoparticle.

The reducing environment may be provided by any solution capable of providing ions suitable for the reduction of metal ions. In various embodiments, the reducing environment may be provided by a hydride, for example a borohydride. In various embodiments, the borohydride may be potassium borohydride ($KBH_4$) or ammonium borohydride ($NH_4BH_4$). Reaction conditions such as amount of reducing agent and the selection of the solvent in which the reduction is carried out may be adjusted to control the way and the amount of metal deposited on the carbon particles.

In one embodiment, the thus obtained carbon particles may be Ni—B/carbon.

In various embodiments, forming the catalytic nanoparticles on carbon particles may further include washing and drying the carbon particles after forming the catalytic nanoparticles on the carbon particle surface.

In various embodiments, dispersing the carbon particle in a solution comprising precursors of the catalyst support to form a suspension may include homogenizing the suspension.

In one embodiment, homogenizing the suspension may be carried out by ultrasonication.

In various embodiments, heating the suspension to form a gel may be include heating to a temperature of about 100° C. to about 300° C. The heating may be carried out with simultaneous stirring on a hot plate.

In various embodiments, subjecting the gel to incineration to form a gel may include heating the gel to a temperature above about 300° C. In various embodiments, the gel is a chelating gel obtained by assimilating the carbon particles with the catalytic particles deposited thereon into an (aqueous) solution of catalytic support precursors, such as cerium and gadolinium ions. The precursors of the catalytic support may be used in form of nitrates and/or the solution may further comprise glycine. Once the carbon particles are assimilated into the precursor solution, the solution may be heated to concentrate the suspension and form a gel. The gel may then be subjected to incineration, for example a combustion process. The combustion may be self-sustained, for example using glycine as the fuel and the nitrate as an oxidizing agent. The combustion may also be self-igniting. In various embodiments, this incineration/combustion step yields a powder.

In various embodiments, the following step of sintering the powder may include calcining the powder in a furnace. In one embodiment, the sintering may be carried out at a temperature above about 300° C.

The present invention also encompasses the catalyst comprising catalytic nanoparticles and a catalyst support, wherein the catalytic nanoparticles are embedded in the catalyst support, wherein said catalyst is obtained or obtainable by the methods of the invention.

In one embodiment, the catalyst may be a $Ni/Ce_{0.9}Gd_{0.1}O_{1.95}$ catalyst comprising nickel nanoparticles embedded in a catalyst support of formula $Ce_{0.9}Gd_{0.1}O_{1.95}$.

In further aspects, the invention also features a method for auto-thermal reforming of a hydrocarbon-containing composition, such as a fuel, comprising contacting present catalyst with said hydrocarbon-containing composition.

In one embodiment, the hydrocarbon-containing composition is a fuel, for example diesel or kerosene.

In various embodiments, the fuel may include aliphatic hydrocarbons and, optionally, at least one aromatic compound. In one embodiment, the fuel may include less than about 25 wt % aromatic compound.

In various embodiments, the fuel may include sulfur-containing compound. In one embodiment, the fuel may include less than 50 ppm sulfur-containing compound.

Various embodiments relates to the use of the catalyst of the invention for auto-thermal reforming of a hydrocarbon-containing compositions or fuels. These compositions and fuels may be as defined above.

In one embodiment, the invention is directed to a method for forming a Ni catalyst embedded in a $Ce_{0.9}Gd_{0.1}O_{1.95}$ catalyst support for auto-thermal reforming of diesel fuels. According to this method, Ni nanoparticles are first deposited on activated carbon powder with a high specific surface area in an electroless Ni plating bath. The Ni nanoparticles formed under the controlled bath conditions are smaller than about 3 nm, which are oxidized to NiO nanoparticles when exposed to air during drying. The NiO nanoparticles-loaded carbon powder is then assimilated into a chelating gel made of $Ce^{4+}$, $Gd^{3+}$ and glycine. After that, the gel-carbon powder mixture is subjected to incineration at around 400° C., through which the chelating gel is transformed to $Ce_{0.9}Gd_{0.1}O_{1.95}$ microparticles. As a result, the NiO nanoparticles are in-situ embedded in the $Ce_{0.9}Gd_{0.1}O_{1.95}$ particles. The resultant $NiO/Ce_{0.9}Gd_{0.1}O_{1.95}$ is the precursor of $Ni/Ce_{0.9}Gd_{0.1}O_{1.95}$ which is the effective catalyst for diesel reforming. The $NiO/Ce_{0.9}Gd_{0.1}O_{1.95}$ precursor is converted to the catalytic form $Ni/Ce_{0.9}Gd_{0.1}O_{1.95}$ by $H_2$ reduction. The catalyst displays good performance in terms of catalytic activity, resistance to carbon deposition and resistance to sulfur poisoning during auto-thermal reforming of diesel fuels. The catalytic activity testing results show that using the surrogate diesel feed comprising 75% dodecane, 25% tetralin, and 50 ppm 3-methylbenzothiophene, the conversion is more than 95%, hydrogen selectivity is greater than 60% and stable operation without degradation is longer than 100 h. The present method enables the nanosized Ni particles to be deposited on the activated carbon powder with a high specific surface area in an electroless Ni plating bath. As the Ni nanoparticles are implanted in the $Ce_{0.9}Gd_{0.1}O_{1.95}$ catalyst support materials, migration and coalescence of Ni are constrained by the surrounding $Ce_{0.9}Gd_{0.1}O_{1.95}$ catalyst support materials. Further, interaction between Ni and the $Ce_{0.9}Gd_{0.1}O_{1.95}$ catalyst support material is improved. In the glycine nitrate combustion process, the $Ce_{0.9}Gd_{0.1}O_{1.95}$ catalyst support materials contacts the Ni particles at high temperatures for a short period of time, which results in strong interaction between them. The catalytic activity is improved by the large surface area of the Ni catalyst while the resistance to carbon deposition and resistance to sulfur poisoning is improved as the Ni catalytic sites are protected by the gadolinium-doped ceria.

Various embodiments of the present invention further provide catalysts comprising nickel nanoparticles embedded in a gadolinium-doped ceria catalyst support. The catalyst support may include 10 mol % of gadolinium. Further, the catalysts may include 15 wt % of nickel. Lower amount or higher amount of nickel may also be incorporated.

In order that the invention may be readily understood and put into practical effect, particular embodiments will now be described by way of the following non-limiting examples.

EXAMPLES

Example 1

Preparation of Activated Carbon Powder

A first aqueous precursor solution was prepared by dissolving 0.125 g of $PdCl_2$ and 3.6 g of $SnCl_2.2H_2O$ in 2.5 ml of HCl (37%), and then adding 2.5 ml of deionized water to dilute the solution.

A second aqueous precursor solution was prepared by dissolving 37.5 g of NaCl in deionized water to 250 ml.

Then the first solution was introduced into the second solution with stirring at 45° C. for 2 h.

27 g of carbon powder (XC-72) was first purified in deionized water and then dispersed in the above solution mixture by ultrasonication and mechanical stirring. After washing by HCl (3.7%) to remove $SnCl_4$, the Pd-activated carbon powder was washed in deionized water by centrifugation for a few times and dried at 80° C. overnight. The Pd-activated carbon powder contains about 0.3 wt. % Pd.

Example 2

Deposition of Ni Nanoparticles onto Activated Carbon Powder

An aqueous precursor solution was prepared by dissolving 4.8 g of $NiSO_4 \cdot 6H_2O$ in about 300 ml of deionized water. About 4.4 ml of ethylenediamine was added to the solution and mixed thoroughly. About 2.2 g of $KBH_4$ was added, and then the solution was diluted by adding deionized water to 400 ml and the pH value was adjusted to 13.4 by adding NaOH.

About 2 g of Pd-activated carbon powder of Example 1 was introduced into the above precursor solution in a beaker, dispersing the powder by ultrasonication for 5 min. Then the resulting suspension was transferred to a round bottom flask that was in a water bath of about 50° C. The suspension was magnetically stirred for 10 min to allow the deposition of nickel boron to take place. The resultant powder was washed in deionized water by centrifugation for a few times and dried at 80° C. overnight. The concentration of nickel nanoparticles in the solution before reaction was 2,330 ppm. After reaction, the concentration of nickel nanoparticles in the solution, as determined by ICP-MS, was 680 ppm. About 71% of nickel nanoparticles in the solution was deposited on the carbon powder.

Example 3

Formation of the Ni/GDC Catalyst

An aqueous precursor solution was prepared by dissolving about 9.6 g of $Ce(NO_3)_3 \cdot 6H_2O$, 1.1 g of $Gd(NO_3)_3 \cdot 6H_2O$, 0.7 g of citric acid, 5.5 g of glycine in 10 ml of deionized water. After fully dissolved, about 35 ml of ethylene glycol was added and mixed thoroughly. The Ni-loaded activated carbon powder obtained in Example 2 was introduced into the above solution in a beaker, homogenizing the suspension by ultrasonification, concentrating the suspension by stirring it on a hot plate at 200° C. As a result, a highly viscous gel was obtained. Then the viscous gel was heated to 400° C. Autoignition self-sustained combustion took place. This method is called glycine nitrate combustion method.

The powder obtained after combustion was transferred to a crucible and calcined in a furnace at 400° C. for 4 h. Ni implanted in $Ce_{0.9}Gd_{0.1}O_{1.95}$ with about 15 wt. % Ni was obtained. Boron was not detected by XPS, EDX and ICP-MS analyses. The content of Pd is approximately 0.1 wt % in the resulting catalyst support. The catalyst powder was formed of particles with sizes in the range of 0.2-0.4 mm for ATR test.

Example 4

Testing of the Catalytic Activity of the Ni/GDC Catalyst

Figure 11:
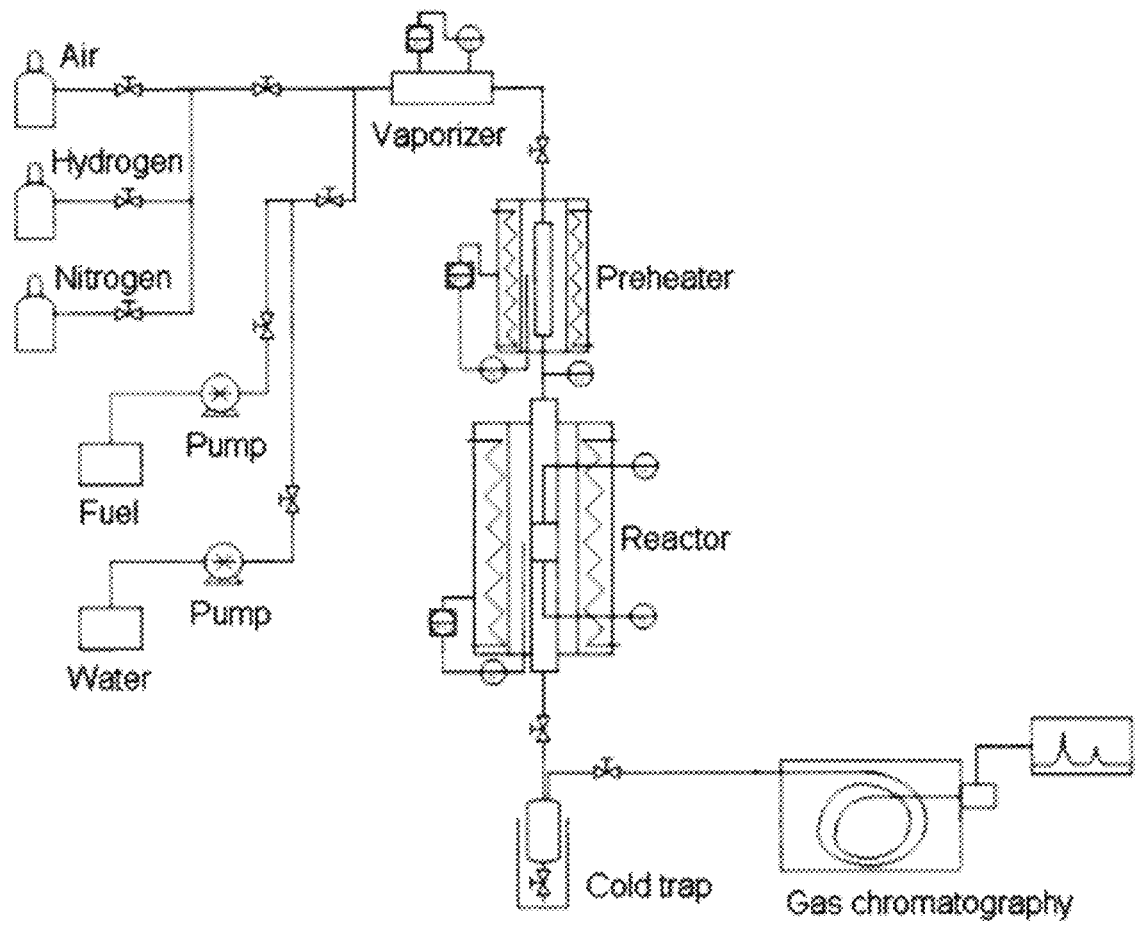
FIG. 11 shows a micro reactor system used for the diesel auto-thermal reforming reaction.

The catalytic activity of the Ni/GDC catalyst of Example 3 in ATR was determined using the micro reactor system shown in FIG. 11. The reactor was loaded with about 0.21 g of the catalyst. Before catalytic activity testing in auto-thermal reforming of diesel fuels, NiO/GDC was reduced to Ni/GDC by a mixture of $H_2/N_2$.

Figure 6:
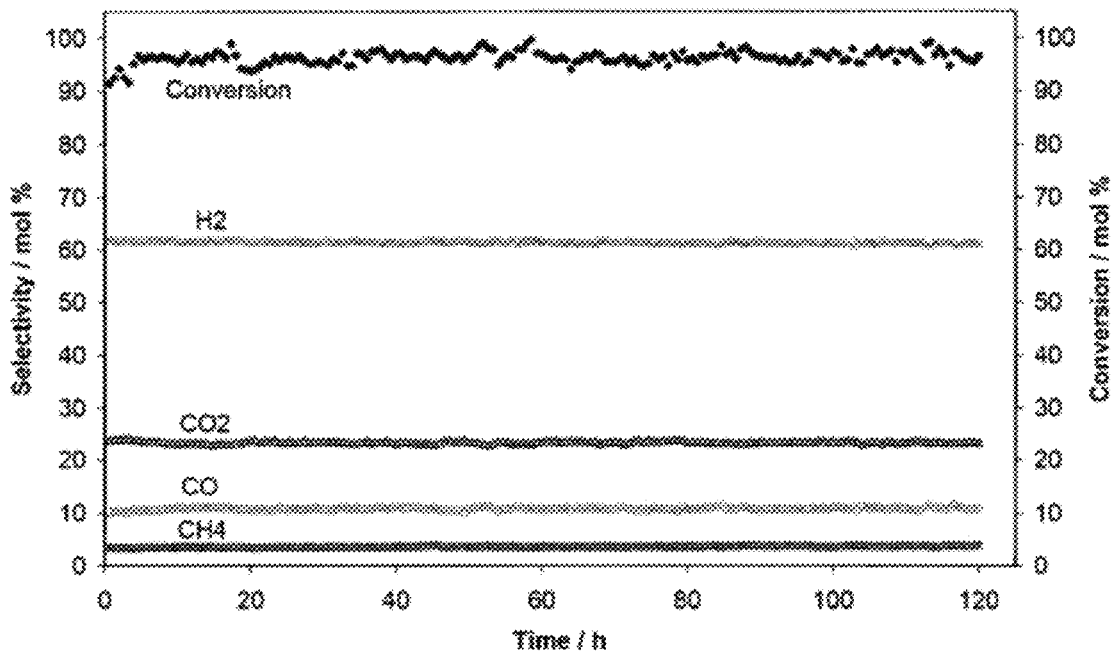
FIG. 6 shows the time-dependent performance profiles of the (about 15 wt % Ni) Ni/GDC catalyst of Example 3, in ATR of a mixture consisting of about 75 wt % dodecane, about 25 wt % tetralin, and about 50 ppm 3-methyl-benzothiophene (MBTP) at the reaction condition O/C=0.7, $H_2O$/C=3, GHSV=5000 $h^{-1}$, and 750° C.

The conditions used for the AIR test were as follows: preheater temperature: 250° C.; reactor temperature: 750° C.; gas hourly space velocity: 5000 $h^{-1}$; $H_2O/C$ ratio: 3.0; O/C ratio: 0.7. While the tap density of catalyst particles is 0.55 g/ml, the flow rates were as follows: fuel (75% dodecane and approximately 25% tetralin): 0.005 ml/min, water: 0.015 ml/min, air: 10.4 sccm. The outlet gases were arranged to pass a cold trap to remove steam and then analyzed with the programmable gas chromatography (GC) equipped with a thermal conductivity detector (TCD) and a flame ionization detector (FID). The conversion and product selectivity of the supported catalyst was tested for 16 h and averages of the last 8 hours were calculated, as listed in Table 1. The operation stability of the catalyst was tested for 120 h and is shown in FIG. 6. The activity of the present catalyst remained relatively constant.

RESULTS AND DISCUSSION

Nanosized Ni particles were deposited on an activated carbon powder with a high specific surface area in an electroless Ni plating bath. Nickel sulfate was used as the nickel source rather than nickel nitrate that was traditionally used to make the Ni-based catalyst, and then organic complexing agent was added in the nickel sulfate solution to form a stable nickel compound. $KBH_4$ was then added as a reducing agent. The high specific surface area of the carbon powders (>200 $m^2/g$), activated by Pd, were used as targets for the deposition of Ni particles. After the carbon powder was fully dispersed in the Ni precursor solution by ultrasonication, increasing the temperature of the suspension caused precipitation of nickel and boron on the carbon surface to produce Ni—B/carbon. Due to the large surface area of carbon, the number of nuclei was tremendous and as a result, very tiny nanoparticles were obtained. The powder was then washed and dried in air. During the step of drying in air, due to the high activity of Ni nanoparticles, elemental Ni might have been oxidized to NiO nanoparticles.

Figure 3:
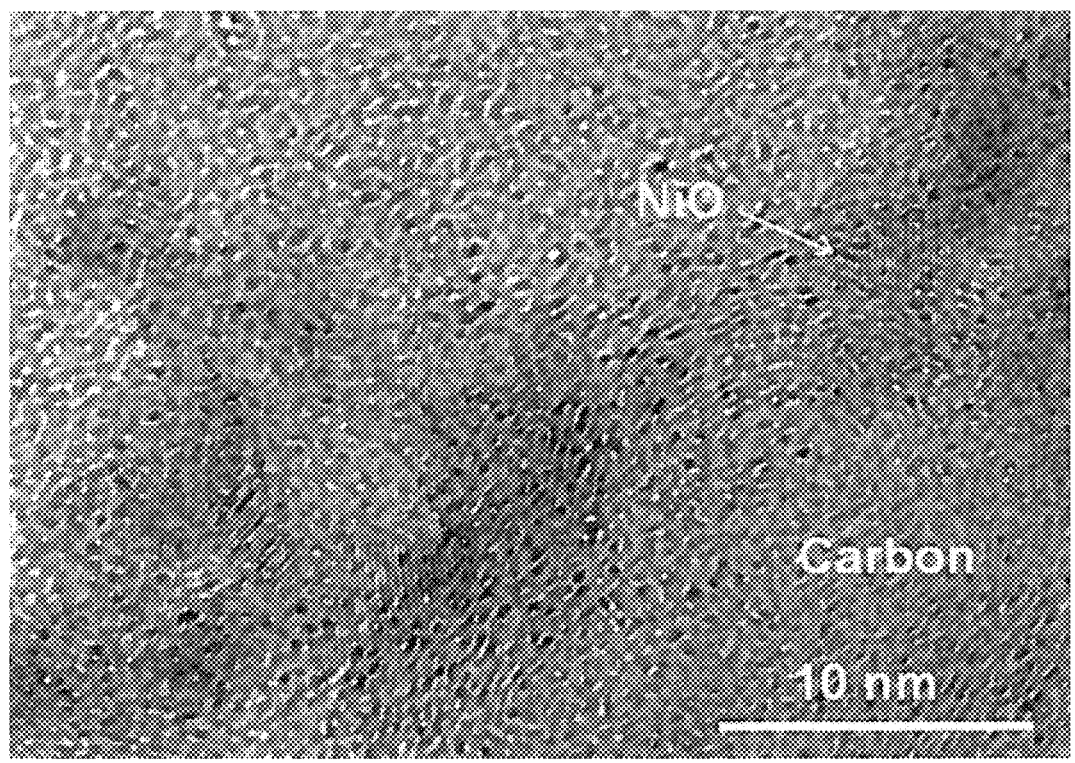
FIG. 3 shows the high resolution transmission electron microscope (HRTEM) image of the NiO nanoparticles deposited on carbon particle of Example 2.

The microstructure of the NiO nanoparticles deposited on the activated carbon powder of Example 2 was observed by HRTEM and is shown in FIG. 3. The carbon shows the partially graphitic structure and the NiO (indicated by an arrow), which is smaller than approximately 3 nm, is deposited on the surface of carbon. The fringe spacing of the particles is 0.242 nm corresponding to the MO (111) face.

Figure 4:
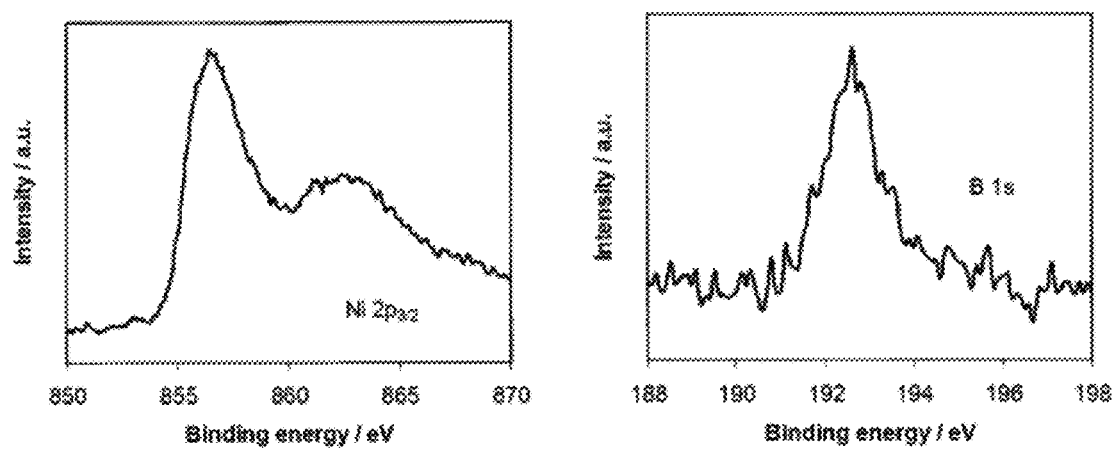
FIG. 4 shows the X-ray photoelectron spectroscopy (XPS) spectra of the as-plated Ni—B/carbon of Example 2.
Figure 5:
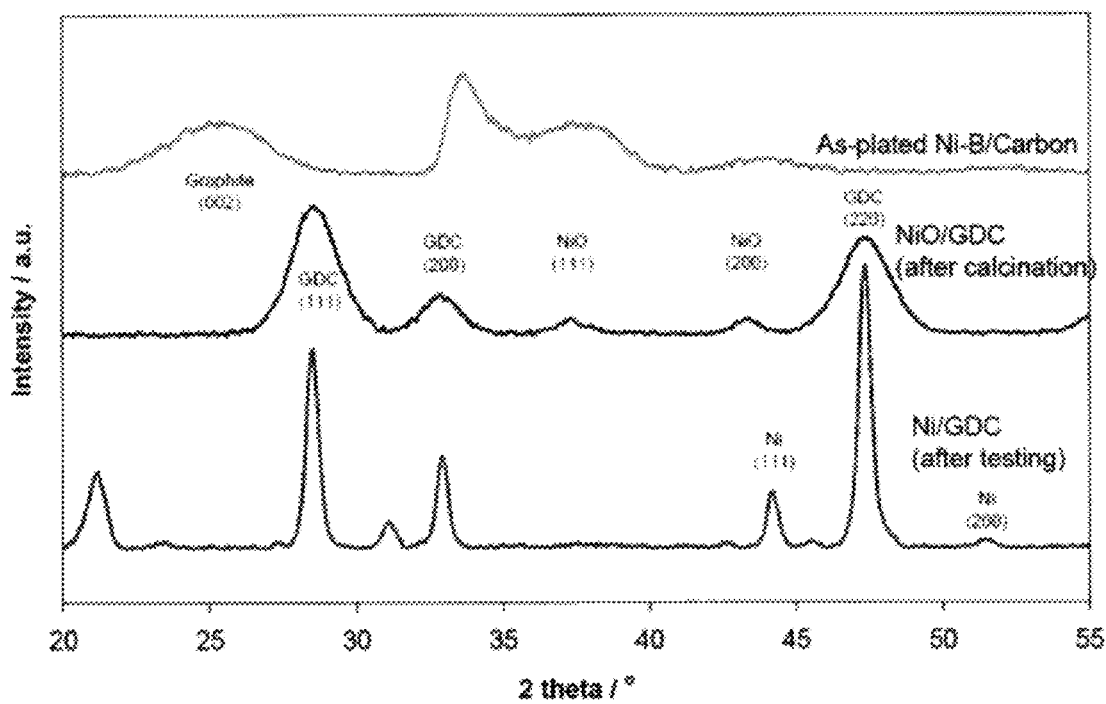
FIG. 5 shows the X-ray diffraction (VIP) patterns of Ni-based catalyst of Example 3, at different stages.

The electronic state of the as-plated Ni—B/carbon of Example 2 was characterized by XPS and is shown in FIG. 4. The binding energy of Ni $2p_{3/2}$ is 856.4 eV, similar to that of Ni in oxidized nickel (355.7 eV) and different from that of elemental Ni (853 eV). The binding energy of B 1s is 192.6 eV, similar to that of B in $B_2O_3$ (193.2 eV) and different from that of element B (188.2 eV). In the XRD pattern as shown in FIG. 5, the phases of NiO can be identified. The reason that oxidized nickel was observed instead of elemental nickel might be due to the high activity of Ni nanoparticles that was oxidized during drying in air.

Next, the NiO nanoparticles-loaded carbon powder was assimilated into a chelating gel made of $Ce^{4+}$, $Gd^{3+}$ and glycine. After that, the gel-powder mixture is subjected to incineration at around 400° C., through which the chelating gel is transformed to $Ce_{0.9}Gd_{0.1}O_{1.95}$ ceramic microparticles. Advantageously, the NiO nanoparticles are in-situ embedded at the surface of the $Ce_{0.9}Gd_{0.1}O_{1.95}$ microparticles. The average crystalline sizes of NiO and GDC calculated by the Scherrer Equation were 9.3 nm and 4.2 nm, respectively. The resultant $NiO/Ce_{0.9}Gd_{0.1}O_{1.95}$ is the precursor of $Ni/Ce_{0.9}Gd_{0.1}O_{1.95}$ which is the effective catalyst for diesel fuel reforming. Before catalytic activity testing in auto-thermal reforming of diesel fuels, NiO/GDC was reduced to Ni/GDC by a mixture of $H_2/N_2$. After 120 h testing at 750° C. the crystalline size of nickel as determined by XRD was about 20 nm.

The catalytic activities and selectivity of the Ni/GDC of Example 3 were evaluated in ATR conditions using surrogate diesel, as listed in Table; 1.

TABLE 1

Conversion and Product Selectivity of Surrogate Diesel ATR

| | Catalyst | | | | | |
|---|---|---|---|---|---|---|
| | 1.5% Ni/GDC | 1.5% Ni/GDC | 7.5% Ni/GDC | 7.5% Ni/GDC | 7.5% Ni/GDC | 15% Ni/GDC |
| Fuel | Dodecane | 75% Dodecane, 25% Tetralin | 75% Dodecane, 25% Tetralin | 75% Dodecane, ~25% Tetralin, 20 ppm MBTP | 75% Dodecane, ~25% Tetralin, 50 ppm MBTP | 75% Dodecane, ~25% Tetralin, 30 ppm MBTP |
| Conversion (%) | 97.9 | 90.2 | 96.3 | 95.9 | 93.9 | 96.3 |
| Product selectivity | | | | | | |
| $H_2$ (mol %) | 62.1 | 60.5 | 61.6 | 61.9 | 61.2 | 61.4 |
| $CO_2$ (mol %) | 22 | 25.3 | 23.3 | 23.5 | 23.8 | 23.6 |
| CO (mol %) | 10.6 | 9.95 | 11 | 10.8 | 10.7 | 10.9 |
| $CH_4$ (mol %) | 4.64 | 3.68 | 3.54 | 3.47 | 3.8 | 3.67 |

*MPTP: 3-methyl-benzothiophene

Firstly, Ni/GDC containing 1.5 wt % Ni (i.e. 1.5% Ni/GDC) was tested in ATR of dodecane. This catalyst showed very good conversion (>97%), high $H_2$ selectivity (>62%), and chemical resistance to carbon deposition.

Secondly, the Ni/GDC catalyst of Example 3 was utilized to test reforming of aromatic-containing surrogate diesel. It is known that aromatic hydrocarbons are chemically far more stable than aliphatic hydrocarbons. Hence, including aromatic component into dodecane would test if a reforming catalyst could, on the one hand, offer high reforming activity and, on the other hand, be sufficiently resistant to the deposition of carbon. For this purpose, the surrogate fuel comprised 75% of dodecane and 25% of tetralin. The result showed that the conversion was approximately 90% using 1.5% Ni/GDC. In order to improve the conversion, Ni/GDC catalyst containing 7.5 wt % Ni (7.5% Ni/GDC) was tested using the same fuel. The conversion increased to more than 96%, which implied that increasing of Ni content could improve the catalytic activity of the catalyst.

Thirdly, substituted thiophenes may also be a component in a diesel fuel. They are strong poisoning reagent to transition metal catalysts. In this test, 3-methyl-benzothiophene (MBTP) was chosen as the representative sulfur-containing compound to formulate the surrogate diesel fuel. After passing the aromatic screening test, the 7.5% Ni/GDC catalyst of Example 3 was then employed to undertake ATR of the surrogate diesel comprising dodecane (75%), tetralin (approximately 25%) and MBTP (20 and 50 ppm). With the increase in sulfur content, the conversion was reduced. In order to improve the performance with sulfur-containing compound feed, 15 wt % of Ni was supported in GDC (15% Ni/GDC), which resulted in an improved conversion. The operation stability of the catalyst was tested by running ATR for 120 h. As shown in FIG. 6, no performance degradation was found.

Figure 7:
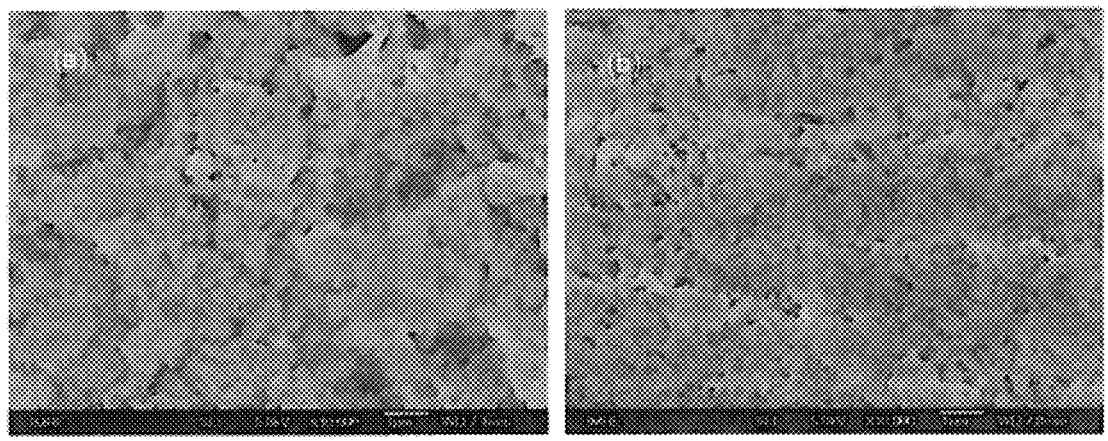
FIG. 7 shows the micro-morphologies of (a) fresh (about 15 wt % Ni) Ni/GDC of Example 3 and (b) after being used in ATP of the mixture consisting of about 75 wt % dodecane, about 25% tetralin and about 50 ppm MBTP for 120 h.

The microstructure analysis of 15% Ni/GDC was performed using field emission scanning electron microscopy (FESEM). Compared with the fresh catalyst shown in FIG. 7(*a*), FIG. 7(*b*), after being used for 120 h, shows that the macro-pores disappeared and the Ni catalyst became relatively dense packed, but lots of meso-pores are still available. No carbon deposition could be found on the surface of the Ni catalyst, which was also verified by XPS analysis.

Figure 8:
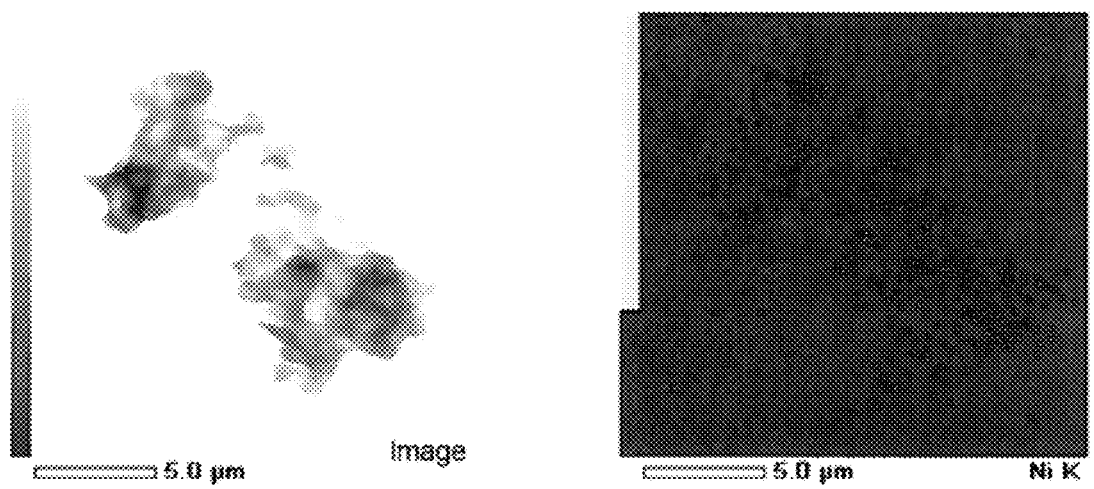
FIG. 8 shows a mapping of the Ni distribution of calcined about (15 wt % Ni) Ni/GDC catalyst of Example 3, by TEM/EDX.

There are three main reasons that the Ni/GDC catalyst of Example 3 have excellent catalytic activity, high resistance to carbon deposition and resistance to sulfur poisoning:

First, the nanosized Ni particles have high specific surface area and are uniformly implanted in the GDC catalyst support. FIG. 8 shows the mapping of Ni distribution of calcined 15% Ni/GDC catalyst taken by TEM/EDX. As indicated, the Ni nanoparticles were uniformly distributed. Since Ni nanoparticles are implanted in the GDC microparticles, their migration and coalescence were constrained by the surrounding GDC microparticles.

Second, the GDC support itself has catalytic activity for thermal cracking of heavy hydrocarbons, high resistance to carbon deposition and resistance to sulfur poisoning. Ceria is most widely used in three-way catalyst formulations for the clean up of automotive exhausts, for instance. In diesel reforming process, ceria has high thermal cracking catalytic activity. Ceria can play a role in converting most of the heavy hydrocarbons to light hydrocarbons, and then the Ni catalysts complete the reforming process. The high resistance to carbon deposition of the ceria is attributed to its high oxygen storage capacity and oxygen mobility. Ceria doped with gadolinium can increase its oxygen anion conductivity and as a result, it is easier to transfer oxygen to the nickel catalyst supported in the GDC catalyst support, allowing deposited carbon to be attacked by oxygen from beneath. In the reforming condition, some of $CeO_2$ is reduced to $Ce_2O_3$, which was characterized by XRD (FIG. 5). Sulfidation equilibrium constant of $Ce_2O_3$ is higher than that of $CeO_2$. As sulfur is introduced to the reduced state of ceria, sulfidation occurs rapidly. The initial sulfidation is an irreversible step. However, any additional surface sulfidation beyond this point is reversible. $Ce_2O_3$ therefore plays a sacrificial role to allow the Ni catalyst to remain active longer.

Figure 9:
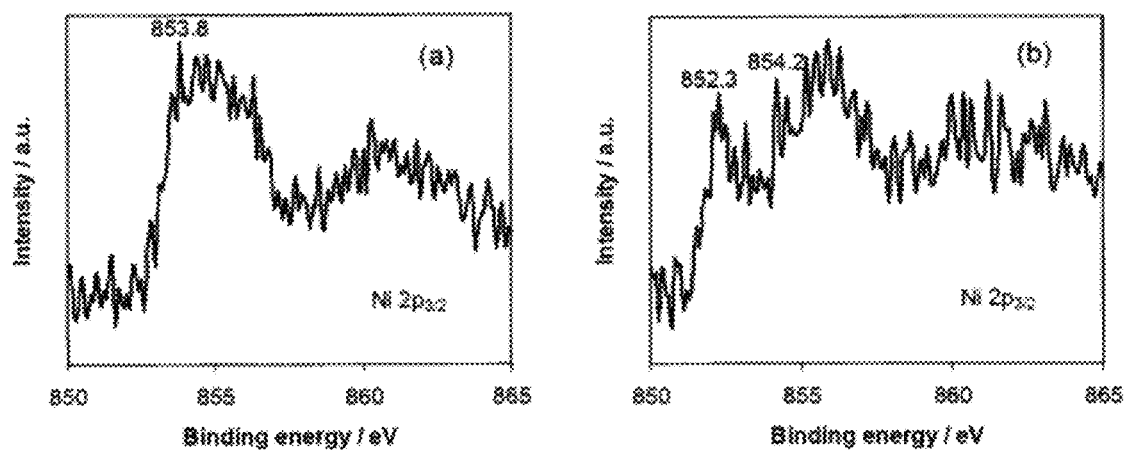
FIG. 9 shows the XPS spectra of Ni/GDC catalyst of Example a (a) after calcination and (b) after 120-h testing.

Third, the Ni active sites are protected by strong interactions between the Ni catalyst and the GDC catalyst support. The protection of Ni by GDC came from the strong interaction between Ni and GDC, which was characterized by XPS as indicated in FIG. 9. The binding energy peak of Ni $2p_{3/2}$ is at 855.7 eV for oxidized nickel and 853 eV for elemental nickel. From XRD analysis, it was determined that only NiO exists in the calcined NiO/GDC catalyst. XPS spectrum of calcined NiO/GDC catalyst as shown in FIG. 9(*a*) indicates that it was shifted by 2 eV due to the strong interaction between nickel and GDC. XPS spectrum of the tested catalyst as shown in FIG. 9(b) also showed shifted peaks. This strong interaction comes from the intimate contact between them.

Figure 10:
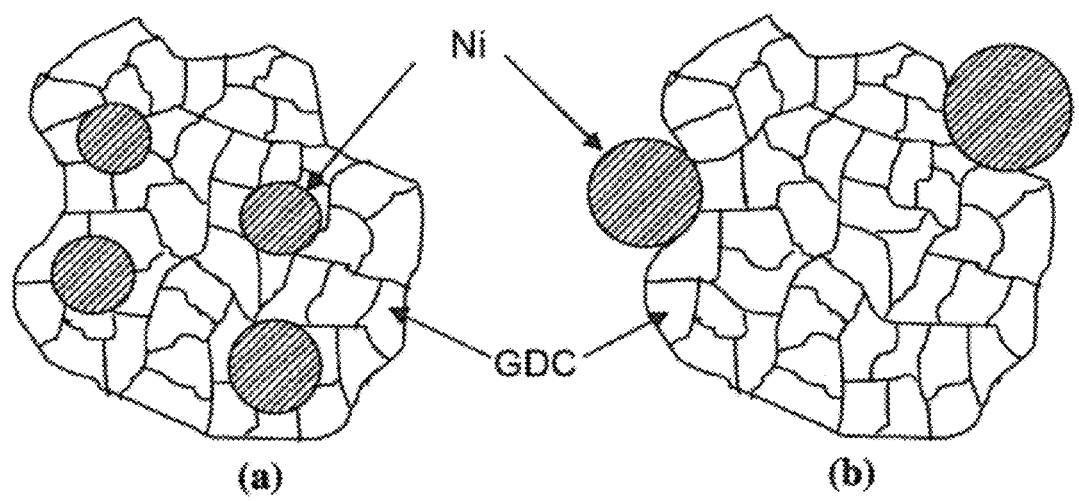
FIG. 10 shows schematic diagrams of Ni/GDC interaction made by (a) the present method and (b) the conventional impregnation method.

FIG. 10 shows a schematic diagram of Ni/GDC interaction made by (a) the present method and (b) the conventional impregnation method. A GDC microparticle contains dozens of crystals. For the Ni/GDC made by the present method, the Ni nanoparticles are implanted in the GDC microparticles, allowing each Ni atom to be very close to the GDC microparticle (FIG. 10(a)). As a result, the GDC catalyst support plays the role of nickel catalyst protector effectively. In contrast, if the Ni/GDC catalyst is made by the traditional impregnation method, the Ni nanoparticles do not interact with the GDC microparticles and could only reside on the surface of GDC microparticles and would grow to larger size (FIG. 10(b)) and consequently, the Ni atoms away from the GDC could not be protected by the GDC.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

By "about" in relation to a given numerical value, such as for temperature and period of time, it is meant to include numerical values within 10% of the specified value.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

What is claimed is:

1. A method for forming a catalyst comprising catalytic nanoparticles and a catalyst support, wherein the catalytic nanoparticles are embedded in the catalyst support, the method comprising:
   forming the catalytic nanoparticles on carbon particle;
   dispersing the carbon particle in a solution comprising precursors of the catalyst support to form a suspension;
   heating the suspension to form a gel;
   subjecting the gel to incineration to form a powder; and
   sintering the powder to form the catalyst, wherein the catalytic nanoparticles are nickel nanoparticles.

2. The method of claim 1, wherein the catalyst is produced in form of ceramic microparticles.

3. The method of claim 1, wherein the method further comprises the step of activating the catalyst by reduction.

4. The method of claim 3, wherein the reduction includes contacting the catalyst with hydrogen.

5. The method of claim 1, wherein the catalyst support is gadolinium-doped ceria.

6. The method of claim 5, wherein the catalyst support is of the formula $Ce_{0.9}Gd_{0.1}O_{1.95}$.

7. The method of claim 1, wherein the solution comprising precursors of the catalyst support is a solution comprising $Ce^{4+}$ and $Gd^{3+}$ ions.

8. The method of claim 7, wherein the solution comprising precursors of the catalyst support is an aqueous solution comprising cerium nitrate and gadolinium nitrate.

9. The method of claim 7, wherein the solution further comprises glycine.

10. The method of claim 1, wherein forming the catalytic nanoparticles on carbon particle comprises depositing the catalytic nanoparticles on the surface of the carbon particle.

11. The method of claim 10, wherein depositing comprises precipitating the catalytic nanoparticles on surfaces of the carbon particle.

12. The method of claim 11, wherein precipitating comprises electrochemical plating of the catalytic nanoparticles on the carbon particle.

13. The method of claim 12, wherein precipitating comprises electroless plating of the catalytic nanoparticles on the carbon particle.

14. The method of claim 1, wherein the dispersing step further comprises homogenizing the suspension.

15. The method of claim 1, wherein the heating to form a gel is carried out at a temperature of about 100° C. to about 300° C.

16. The method of claim 1, wherein subjecting the gel to incineration comprises heating the gel to a temperature above about 300° C.

17. The method of claim 1, wherein sintering the powder is carried out in a furnace.

18. The method of claim 1, wherein sintering is carried out at a temperature above about 300° C.

19. The method of claim 1, wherein the catalytic nanoparticles are smaller than about 10 nm.

20. The method of claim 19, wherein the catalytic nanoparticles are smaller than about 3 nm.

21. The method of claim 1, wherein the carbon particle comprises activated carbon powder.

22. The method of claim 21, wherein the activated carbon powder comprises palladium-activated carbon powder.

23. The method of claim 1, wherein the specific surface area of the carbon powder is at least about 100 m²/g.

24. The method of claim 23, wherein the specific surface area of the carbon powder is about 200 m²/g.

25. The method of claim 1, wherein the catalyst is a $Ni/Ce_{0.9}Gd_{0.1}O_{1.95}$ catalyst comprising nickel nanoparticles embedded in a catalyst support of formula $Ce_{0.9}Gd_{0.1}O_{1.95}$.

26. The method of claim 25, wherein the nickel content is between 5 and 30% by weight of the catalyst.

27. The method of claim 26, wherein the nickel content is about 15% by weight of the catalyst.

28. The method of claim 1, wherein forming the catalytic nanoparticles on carbon particle comprises providing an aqueous solution of a catalytic metal salt, adding an organic complexing agent to form a stable nickel complex, adding a reducing agent, dispersing the carbon particle in the solution and heating the solution to precipitate the catalytic metal on the carbon particle surface, wherein the metal salt is a nickel salt.

29. The method of claim 28, wherein the nickel salt is nickel sulfate or nickel nitrate.

30. The method of claim 28, wherein the reducing agent is a borohydride.

31. The method of claim 30, wherein the borohydride is $KBH_4$.

32. The method of claim 28, wherein the carbon particle is Pd-activated carbon powder.

33. The method of claim 28, wherein the obtained carbon powder is Ni—B/carbon.

34. The method of claim 28, further comprising washing and drying the carbon powder after forming the catalytic nanoparticles on the carbon particle surface.

35. A catalyst comprising catalytic nanoparticles and a catalyst support, wherein the catalytic nanoparticles are embedded in the catalyst support, the catalyst being obtained by a method comprising:
    forming the catalytic nanoparticles on carbon particle;
    dispersing the carbon particle in a solution comprising precursors of the catalyst support to form a suspension;
    heating the suspension to form a gel;
    subjecting the gel to incineration to form a powder; and
    sintering the powder to form the catalyst, wherein the catalytic nanoparticles are nickel nanoparticles.

36. The catalyst of claim 35, wherein the catalyst is a $Ni/Ce_{0.9}Gd_{0.1}O_{1.95}$ catalyst comprising nickel nanoparticles embedded in a catalyst support of formula $Ce_{0.9}Gd_{0.1}O_{1.95}$.

37. A method for auto-thermal reforming of a fuel, comprising contacting a catalyst with said fuel, wherein the catalyst comprises catalytic nanoparticles and a catalyst support, wherein the catalytic nanoparticles are embedded in the catalyst support, the catalyst being obtained by a method comprising:
    forming the catalytic nanoparticles on carbon particle;
    dispersing the carbon particle in a solution comprising precursors of the catalyst support to form a suspension;
    heating the suspension to form a gel;
    subjecting the gel to incineration to form a powder; and
    sintering the powder to form the catalyst, wherein the catalytic nanoparticles are nickel nanoparticles.

38. The method of claim 37, wherein the fuel is a diesel fuel.

39. The method of claim 37, wherein the fuel comprises less than about 25 wt % aromatic compound.

40. The method of claim 37, wherein the fuel comprises less than about 50 ppm sulfur-containing compound.

* * * * *